United States Patent
Seiler

(10) Patent No.: US 12,047,495 B2
(45) Date of Patent: Jul. 23, 2024

(54) METHOD FOR THE INITIAL SETUP AND OF A MACHINE DATA COMMUNICATION NETWORK, METHOD FOR REPLACING A HARDWARE COMPONENT

(71) Applicant: DAIMLER AG, Stuttgart (DE)

(72) Inventor: Christian Seiler, Fellbach-Schmiden (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 313 days.

(21) Appl. No.: 17/632,856

(22) PCT Filed: Jul. 27, 2020

(86) PCT No.: PCT/EP2020/071150
§ 371 (c)(1),
(2) Date: Feb. 4, 2022

(87) PCT Pub. No.: WO2021/023551
PCT Pub. Date: Feb. 11, 2021

(65) Prior Publication Data
US 2022/0271925 A1 Aug. 25, 2022

(30) Foreign Application Priority Data
Aug. 7, 2019 (DE) ............ 10 2019 005 546.2

(51) Int. Cl.
*H04L 29/06* (2006.01)
*H04L 9/08* (2006.01)
*H04L 9/32* (2006.01)

(52) U.S. Cl.
CPC ............ *H04L 9/0825* (2013.01); *H04L 9/085* (2013.01); *H04L 9/0877* (2013.01); *H04L 9/3247* (2013.01)

(58) Field of Classification Search
CPC ..... H04L 9/0825; H04L 9/085; H04L 9/0877; H04L 9/3247; H04L 9/50; H04L 63/126; H04L 9/3236
See application file for complete search history.

(56) References Cited

U.S. PATENT DOCUMENTS 10,833,858 B2 * 11/2020 Gray .................... H04L 9/3236
2018/0343114 A1 11/2018 Ben-Ari
(Continued)

FOREIGN PATENT DOCUMENTS

CN 107464118 A 12/2017
CN 109389498 A 2/2019
(Continued)

OTHER PUBLICATIONS

Robles et al.; "Blockchain Technologies for Private Data Management in AmI Environments;" Proceedings; Oct. 19, 2018 (Year: 2018).*
(Continued)

*Primary Examiner* — Ka Shan Choy
(74) *Attorney, Agent, or Firm* — PATENT PORTFOLIO BUILDERS PLLC

(57) ABSTRACT

A method for the initial setup of a machine data communication network including a network unit provided with a first hardware component having a digital identity. For the digital identity, a signature of the network unit is generated based on a first private key for a communication partner in the machine data communication network. The first private key is stored in a first hardware security module of the first hardware component, and a first public key corresponding to the first private key and the signature is disclosed to the communication partner in order to verify the identity of the network unit. A separate identification device is arranged in the network unit, and the first public key is transferred from the first hardware security module to the identification (Continued)

Figure 1:
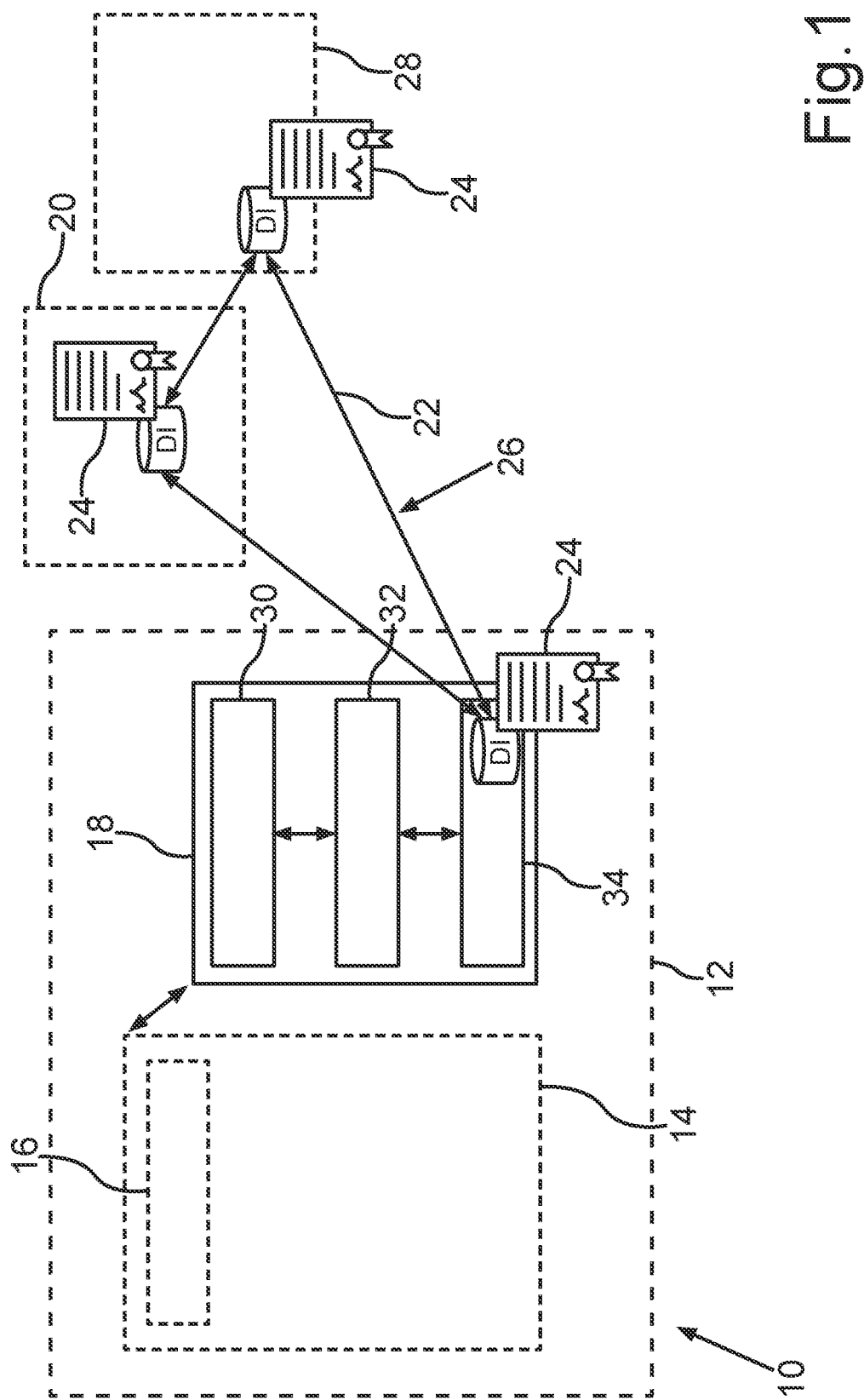

device. The first public key of the identification device is saved in the identification device by an intelligent contract and is transmitted by distributed ledger technology to the communication partner.

13 Claims, 2 Drawing Sheets

(56) References Cited

U.S. PATENT DOCUMENTS

| | | | | |
|---|---|---|---|---|
| 2019/0372779 | A1* | 12/2019 | Monica | H04L 9/0637 |
| 2020/0220723 | A1* | 7/2020 | Rastit | H04L 9/3239 |
| 2020/0266987 | A1* | 8/2020 | Goodman | G06Q 20/0655 |
| 2020/0366653 | A1* | 11/2020 | Caceres | H04L 63/0853 |
| 2021/0027283 | A1* | 1/2021 | Gaddam | G06Q 20/3674 |
| 2022/0182368 | A1* | 6/2022 | Madisetti | H04L 63/061 |

FOREIGN PATENT DOCUMENTS

| | | |
|---|---|---|
| EP | 3425552 A1 | 1/2019 |
| WO | 2018058441 A1 | 4/2018 |
| WO | 2018210567 A1 | 11/2018 |
| WO | 2019120092 A1 | 6/2019 |

OTHER PUBLICATIONS

Office Action dated Sep. 22, 2023 in related/corresponding CN Application No. 202080052702.8.

International Search Report mailed Oct. 29, 2020 in related/corresponding International Application No. PCT/EP2020/071150.

Office Action created Jun. 3, 2020 in related/corresponding DE Application No. 10 2019 005 546.2.

Robles et al.; "Blockchain Technologies for Private Data Management in Aml Environments;" Proceedings; Oct. 19, 2018.

Wikipedia; "Hardware security module;" Wikipedia; retrieved Oct. 15, 2020; https://en.wikipedia.org/w/index.php?title=Hardware_security_module&oldid=909491208.

Written Opinion mailed Oct. 29, 2020 in related/corresponding International Application No. PCT/EP2020/071150.

* cited by examiner

METHOD FOR THE INITIAL SETUP AND OF A MACHINE DATA COMMUNICATION NETWORK, METHOD FOR REPLACING A HARDWARE COMPONENT

BACKGROUND AND SUMMARY OF THE INVENTION

A first aspect of the invention relates to a method for the initial setup of a machine data communication network, in which a network unit of the machine data communication network is provided with a first hardware component having a digital identity, wherein a signature of the network unit is generated for the digital identity based on a first private key for a communication partner of the network unit in the machine data communication network, wherein the first private key is stored in a first hardware security module of the first hardware component, and a first public key corresponding to the first private key and the signature is disclosed to the communication partner, in order to verify the identity of the network unit.

A further aspect of the invention relates to a method for replacing a first hardware component of a network unit of a machine data communication network, in which the network unit of the machine data communication network is provided with a first hardware component having a digital identity, wherein a signature of the network unit is generated for the digital identity based on a first private key for a communication partner of the network unit in the machine data communication network, wherein the first private key is stored in a first hardware security module of the first hardware component, and a first public key corresponding to the first private key and the signature is disclosed to the communication partner, in order to verify the identity of the network unit.

Furthermore, the invention relates to a machine data communication network, a computer program and an electronically readable data medium.

In order to be able to implement reliable machine data communication between different network components, it is known that digital identities of network components, which participate in a network, have to be provided. These digital identities can be used to signify the news of their network unit and to disclose the corresponding public key for the communication partner in the network, such that the signature of the network unit can be verified inside the message of the network component. It is known from the prior art that this private key, which corresponds to the public key, is stored on a hardware security module of the network unit and does not leave the hardware component of the network unit. This has the particular disadvantage that the digital identity of the network gets lost when replacing the hardware component with the hardware security module.

EP 3 425 552 A1 discloses a hardware security module. The hardware security module comprises a processing unit and a cryptographic coprocessor. The cryptographic coprocessor comprises a key memory for storing at least one cryptographic key, a first interface, which is configured in order to receive source data to be processed, a hardware crypto-machine, which is configured in order to process the source data depending on at least one cryptographic key stored in the key memory, a second interface configured to receive a first cryptographic key from the processing unit, and a hardware key administrative switch configured to store the first cryptographic key in the key memory. The cryptographic coprocessor comprises a third interface configured to receive a second cryptographic key, wherein the hardware key administrative switch is configured to store the second cryptographic key in the key memory. The hardware security module comprises a non-volatile memory designed for storing the second cryptographic key, and a hardware configuration module configured for reading the second cryptographic key from the non-volatile memory and for sending the second cryptographic ley to the second interface.

Exemplary embodiments of the present invention are directed to a method for the initial setup of a machine data communication network, a method for replacing a first hardware component of a network unit of a machine data communication network, a machine data communication network, a computer program and an electronically readable data medium, by means of which a replacement of hardware components can be reliably implemented.

One aspect of the invention relates to a method for the initial setup of a machine data communication network, in which a network unit of the machine data communication network is provided with a first hardware component having a digital identity, wherein a signature of the network unit is generated for the digital identity based on a first private key for a communication partner of the network unit in the machine data communication network, wherein the first private key is stored in a first hardware security module of the first hardware component, and a first public key corresponding to the private key and the signature is disclosed to the communication partner in order to verify the identity of the network unit.

It is provided that a separate identification device is arranged in the network unit, and the first public key is transferred from the first hardware security module to the identification device, wherein the first public key of the identification device is stored in the identification device by means of an intelligent contract for the communication of the network unit with the communication partner, and the intelligent contract is transmitted by means of distributed ledger technology to the communication partner for the initial setup of the machine data communication network.

Thus, it is made possible for the communication between the network unit and the communication partner to be carried out via the separate identification device. This has the advantage, in particular, that the hardware component can be replaced, and furthermore, a communication between the network unit and the communication partner can nevertheless be reliably carried out. In particular, the identification device thus retains the identity for the communication partner and, after replacing, a corresponding key replacement process can be carried out, wherein the communication between the network unit, in particular the identification device, and the communication partner can furthermore be carried out.

In particular, the digital identity is thus generated by an asymmetrical cryptographic method. The first private key is thus only known to the hardware component. The corresponding first public key is disclosed. At any time, the hardware component can sign the datasets by means of the first private key. Thus, it is ensured that only the owner of the first private can is also the sender of the message.

In particular, it is provided that the first public key is secured by the specifications in the intelligent contract by the distributed ledger technology and a reference to an analogue identity, such as a vehicle identification number (VIN), for example.

In particular, it can be provided that the machine data communication network has a plurality of communication partners. A backend server of a manufacturer of the network unit and/or a repair service for the network unit, for example, can be seen as the communication partner.

The intelligent contract is also referred to, in particular, as a Smart Contract. The Smart Contract is computer programs which portray the contracts or check whether the negotiation or execution of a contract can be supported technically. A higher degree of contract security can be obtained by means of the Smart Contract in comparison to traditional contract law while simultaneously reducing the transaction costs. Corresponding infrastructure for Smart Contracts can be implemented by a replicated asset register and contract completion via cryptographic hash chains and error-tolerant replication. In particular, it can be provided that the Smart Contract are used with block chains, for example.

The distributed ledger technology, which can also be referred to as a technique of distributed cashbooks, describes a technique used for documenting certain transactions. Here, corresponding books or, in this case, the intelligent contracts are maintained decentralized with any number of principally equivalent copies of this contract from different parties, in other words the network unit and the communication partner, for example. Using the suitable measures ensures that transactions to be newly added are assumed into all copies of the contract and that it results in an accordance, a so-called consensus, about the respectively current state of the contract. With the distributed ledger technology, decentralized guided account books or transaction databases can also be mentioned. The different distributed ledger technologies differ in the way in which the crosslinked computer leads to an agreement.

Thus, it is provided according to the invention that the digital identity of the network unit is embedded or integrated in the hardware security module, wherein this also remains stable when the hardware component is replaced. To do so, the distributed ledger technology and the intelligent contract technology is used, in particular, in order to manage the digital identities of the network unit.

In particular, the hardware security module has corresponding crypto-functions. These crypto-functions can be used, in particular, for generating the private key and the public key. The private key (German: der private Schlüssel) can also be referred to in German as "private key" and the public key (German: der öffentliche Schlüssel) can also be referred to in German as "public key".

According to an advantageous embodiment, changes relating to the configuration between the network unit and the communication partner are changed during a lifecycle of the network unit in the intelligent contract and stored and transferred to the communication partner by means of the distributed ledger technology. In other words, it is provided that any changes are stored inside the machine data communication network in the intelligent contract, wherein these changes can then be transferred to the communication partner by means of the distributed ledger technology, in particular to a plurality of the communication partners. In particular, a communication between the network unit and the communication partner thus still only takes place between the identification device and the communication partner. Any changes are then documented in the intelligent contract, and this contract is then sent to the different components inside the machine data communication network. In particular, it can thus be achieved that each component within the machine data communication network is up-to-date on the corresponding components, since the intelligent contract must also be signed by each component within the machine data communication network. Thus, an improved communication within the machine data communication network can be achieved.

In a further advantageous embodiment, permission information of the network unit and/or software versions of the network unit and/or property information of the network unit and/or insurance information of the network unit and/or system configuration of the network unit and/or freely switched functions within the network unit and/or further hardware components of the network unit can additionally be stored. In particular, it can be provided, for example, that the network unit is provided as a motor vehicle. Corresponding information relating to the motor vehicle can then additionally be stored in the intelligent contract. A motor vehicle manufacturer, in particular a server device, in particular a backend server, of the motor vehicle manufacturer can then be seen as the communication partner, for example. Now, should corresponding changes or new information be stored in the intelligent contract by the network unit, then this is transferred to the corresponding communication partner, i.e., the backend server, for example, such that this is in the image of the corresponding changes. Thus, a reliable communication can be achieved within the machine data communication network.

Furthermore, it has proved to be advantageous when the intelligent contract is generated by means of Corda. Corda is a so-called Open Source system, which uses local intelligent contracts that each only act between two or more direct communication partners. Yet in comparison to blockchain, Corda does not distribute the entire list to everyone, rather only the confirmed transactions to the corresponding participants within the machine data communication network. The participating communication partners moreover only see those transactions that are relevant to them, which constitutes a further difference to the classic blockchain method. To prevent "double spending", so-called notaries are used. By using Corda, a simple and already established method can be used in order to be able to achieve the administration of the intelligent contracts.

In a further advantageous embodiment, a further communication partner is provided within the machine data communication network, wherein the communication is carried out by means of the intelligent contract and the distributed ledger technology additionally with the further communication partner. In particular, it can be provided that a plurality of communication partners, wherein in this case plurality means more than two communication partners, is provided. A corresponding communication can then be carried out by means of the intelligent contract and the distributed ledger technology between the plurality of communication partners and the network unit. Thus, an improved operation of the machine data communication network is achieved.

According to a further advantageous embodiment, a cross-verification is carried out between the identification device and the communication partner and the further communication partner. Cross-verification is to be understood, in particular, to mean that the components are mutually verified within the machine data communication network. In other words, the network unit is verified in relation to the communication partner and the further communication partner. The communication partner is verified in relation to the network unit, in particular the identification device, and in relation to the further communication partner. The further communication partner is verified in relation to the identification device and in relation to the communication partner. Thus, a secure communication between the individual components can be achieved within the machine data communication network.

Furthermore, it has proved to be advantageous when the identification device is provided with an application layer and with a privacy layer and with a trust layer. Thus, it is possible for the corresponding computing operations to be able to be carried out within the identification device based on different layers. In particular, the different layers communicate with one another, and can exchange corresponding data.

Furthermore, it has proved to be advantageous when the intelligent contract is stored on the trust layer. In particular, the contract is also correspondingly changed on the trust layer, and is communicated via the trust layer to the communication partner and possibly a further communication partner.

In a further advantageous embodiment, a motor vehicle is provided as a network unit. In particular, the motor vehicle has a corresponding communication device, in order to be able to carry out the intelligent contract by means of the distributed ledger method to the communication partner, which can be, for example, a backend server of a manufacturer of the motor vehicle.

A further independent aspect of the invention relates to a method for replacing a first hardware component of a network unit of a machine data communication network, in which the network unit of the machine data communication network is provided with a first hardware component having a digital identity, wherein a signature of the network unit is generated for the digital identity based on a first private key for a communication partner of the network unit in the machine data communication network, wherein the first private key is stored in a first hardware security module of the first hardware components, and a first public key corresponding to the first private key and the signature is disclosed to the communication partner, in order to verify the identity of the network unit.

It is provided that a separate identification device is provided in the network unit, and the first public key is transferred from the first hardware security module to the identification device, wherein the first public key of the identification device is stored in the identification device by means of an intelligent contract for the communication of the network unit with the communication partner, and the intelligent contract is transmitted to the communication partner by means of the distributed ledger technology, and wherein, when replacing the first hardware component with a second hardware component, a key replacement process is carried out for replacing the first public key with a second public key for the second hardware component by means of the intelligent contract and the distributed ledger technology.

Thus, it is possible that, should the first hardware component, for example, be defective, it can be easily replaced with the second hardware component. In particular, the communication of the second hardware component with the communication partners can furthermore thus be achieved, since a change of the communication is only carried out inside the identification device. The identification device can automatically carry out the corresponding key replacement process, wherein then only these contracts have to be adjusted based on the intelligent contracts, and here the communication can nevertheless be maintained. When replacing the first hardware component with the second hardware component, this simplifies the communication between the communication partner and the network unit.

Furthermore, it is advantageous when the key replacement process is started by the communication partner for replacing the first hardware component with the second hardware component. Should the communication partner be formed as a service partner, for example, and the first hardware component then be replaced by the service partner, then the communication partner of this can enter into its system and trigger and start the corresponding key replacement process. A corresponding communication with the identification device takes place, wherein the identification device is formed to adjust the intelligent contract in such a way that now the second private key and the second public key are used. The communication partner is in the image via this replacement process, whereby a simplified communication can be achieved inside the machine data communication device.

In an advantageous embodiment, when replacing the first hardware component with the second hardware component during the key replacement process, the state of the intelligent contract is changed. In other words, the corresponding replacement is documented within the intelligent contract, wherein the second public key, in particular, is correspondingly saved for documenting the replacement. In turn, this state of the intelligent contract is then transferred to the communication partner within the machine data communication network. A corresponding verification is then carried out by means of the second key.

Advantageous embodiments of the method according to the first aspect are to be seen as advantageous embodiments of the second method according to the second aspect.

Yet another aspect of the invention relates to a machine data communication network having a network unit, which has a hardware component having a hardware security module and an identification device, and having a communication partner, wherein the machine data communication network is formed to carry out a method according to the first aspect and/or for carrying out a method according to the second aspect.

Yet another aspect of the invention relates to a computer program, which can be loaded directly in a memory of a control device of a processor device of an identification device, in order to carry out the steps of a method according to the first aspect and/or according to the second aspect, when the program is carried out in the control device of the processor device the identification device.

Yet another aspect of the invention relates to an electronically readable data medium having electronically readable control information saved thereon, which comprises at least one computer program according to the preceding aspect and is formed in such a way that it carries out a method according to the first aspect and/or a method according to the second aspect when using the data medium in a control device of a processor device of an identification device.

Advantageous embodiments of the method according to the first aspect and/or advantageous embodiments of the method according to the second aspect are to be seen as advantageous embodiments of the machine data communication network. The machine data communication network has concrete features that enable an implementation of the method according to the first aspect and/or according to the second aspect. In particular, the methods according to the first aspect and/or according to the second aspect are carried out by means of the machine data communication network.

Further advantages, features and details of the invention emerge from the description below of preferred exemplary embodiments and by means of the drawings. The features and feature combinations mentioned above in the description and the features and feature combinations mentioned below in the description of the figures and/or shown only in the figures can be used not only in the respectively specified combination, but also in other combinations or on their own without leaving the scope of the invention.

BRIEF DESCRIPTION OF THE DRAWING FIGURES

Here are shown:

FIG. 1 a schematic flowchart of an embodiment according to a first aspect; and

Figure 2:
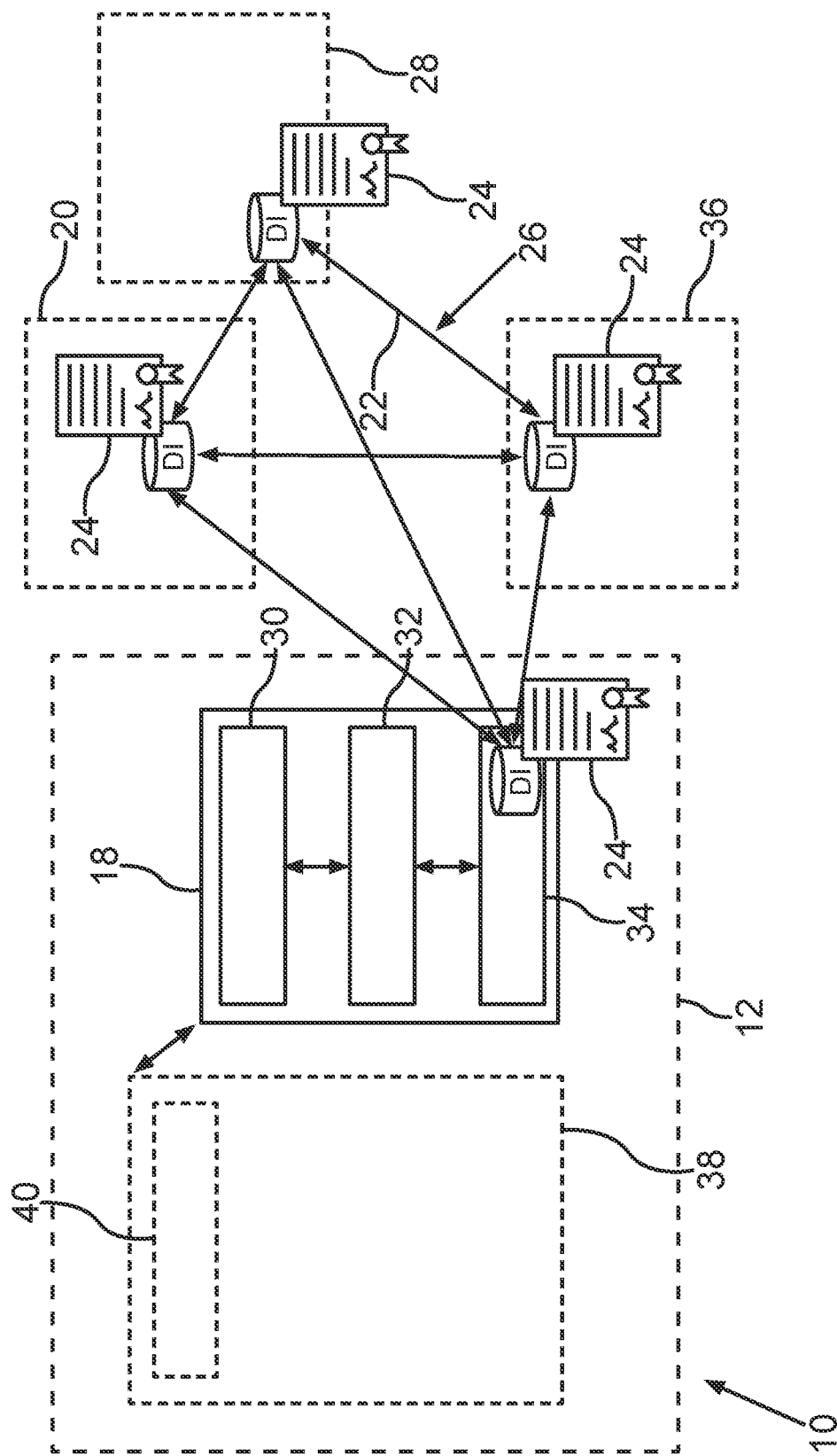

FIG. 2 a further schematic flowchart of an embodiment of a method according to a second aspect.

The same or functionally identical elements are provided with the same reference numerals in the figures.

DETAILED DESCRIPTION

In a schematic view, FIG. 1 shows a flowchart of a method according to a first aspect. FIG. 1 schematically shows a method for the initial setup of a machine data communication network 10. The machine data communication network 10 has a network unit 12. The network unit 12 has a first hardware component 14. The first hardware component 14 has a hardware security module 16. The network unit 12 has an identification device 18 separate from the hardware security module 16.

With the method for the initial setup of the machine data communication network 10, the network unit 12 is provided with the first hardware component 14 and a digital identity DI. For the digital identity DI, a signature of the network unit 12 is generated based on a first private key for a communication partner 20 of the network unit 12 in the machine data communication network 10, wherein the first private key is saved in a first hardware security module 16 of the first hardware component 14, and a first public key corresponding to the first private key and the signature is disclosed to the communication partner 20 in order to verify the identity of the network unit 12.

It is provided that the identification device 18, which is separate from the first hardware component 14, is arranged in the network unit 12, and the first public key is transferred from the first hardware security module 16 to the identification device 18, wherein the first public key of the identification device 18 is saved in the identification device 18 by means of an intelligent contract 24 for the communication of the network unit 12 with the communication partner 20, and the intelligent contract 24 is transmitted by means of the distributed ledger technology 26 to the communication partner 20 for the initial setup of the machine data communication network 10.

It is shown in the present exemplary embodiment that a further communication partner 28 is provided within the machine data communication network 10. The communication can thus be carried out, in particular, between the network unit 12, the communication partner 20, and the further communication partner 28. In particular, the intelligent contract 24 is also provided to the further communication partner 28, such that this can use and verify the digital identity DI of the network unit 12.

In particular, FIG. 1 further shows that a cross-verification 22 is carried out between the identification device 18, the communication partner 20, and the further communication partner 28. The reason for this, in particular, is that the further communication partner 28 is provided within the machine data communication network 10, wherein the communication is additionally carried out with the further communication partner 28 by means of the intelligent contract 24 and the distributed ledger technology.

Furthermore, FIG. 1 shows that changes relating to the configuration between the network unit 12 and the communication partner 20 are changed and saved during a lifecycle of the network unit 12 in the intelligent contract 24 and transferred by means of the distributed ledger technology 26 to the communication partner 20 or to the further communication partner 28.

In particular, FIG. 1 shows that the identification device 18 is provided with an application layer 30, a privacy layer 32, and a trust layer 34. In particular, it can be provided for this that the intelligent contract 24 is saved on the trust layer 34. In particular, the digital identity DI can also be saved on the trust layer 34.

The network unit 12 can be, in particular, a motor vehicle. In other words, a motor vehicle can be provided as the network unit 12.

In particular, it can be provided for this that additional permission information of the network unit 12 and/or software versions of the network unit 12 and/or property information of the network unit 12 and/or insurance information of the network unit 12 and/or system configurations of the network unit 12 and/or freely switched functions within the network unit 12 and/or further hardware components of the network unit 12 are stored in the intelligent contract 24. The reason for this, in particular, is that the network unit 12 is provided as a motor vehicle.

As already mentioned, FIG. 1 shows a method according to a first aspect, in particular during an initial setup. In particular, this initial setup process can be carried out at a first point in time. The network unit 12 is fused to the hardware component 14, wherein the hardware component 14 has, in particular, the first hardware security module 16, in which corresponding crypto-keys, in particular, for the private key and the public key are saved. The public key is transferred from the first hardware component 14 to the identification device 18. This information is saved within the identification device 18 and saved, in particular, within the intelligent contract 24, which can also be referred to as a Smart Contract, which in turn represents the identity of the network unit 12 during the entire lifetime. Thus, the intelligent contract 24 can be seen as the basis for a digital twin of the network unit 12.

Each further piece of information that is significant for the lifecycle of the network unit 12 can be allocated to the intelligent contract 24. Any changes of the intelligent contract 24 are documented and transmitted to the communication partner 20, 28 by means of the distributed ledger technology 26, and all identities of organizations that trigger the changes can be identified at any time, since any components, in particular any communication partners 20, 28, must sign and verify the changes within the intelligent contact 24. In particular, any transaction between the components is cross-verified within the machine data communication network 10, such that the trust can be increased inside the organization, which triggers the transaction. In particular, should the network unit 12 be provided as a motor vehicle, for example, then additional information, such as permission information relating to the motor vehicle, for example, software versions relating to the motor vehicle, a piece of property information relating to the motor vehicle, a piece of insurance information relating to the motor vehicle, a system configuration relating to the motor vehicle, freely switched functions relating to the motor vehicle and hardware components are stored inside the motor vehicle, wherein this is relevant, in particular, when an update is to be carried out during the lifecycle of the network unit 12 or the motor vehicle.

In particular, it is provided that the intelligent contract is generated by means of Corda. Corda is a so-called Open Source system that uses intelligent contracts 24, which each act only between two or more direct communication partners 20, 28. Yet in comparison to blockchain, Corda does not distribute the entire list to everyone, but only the confirmed transactions to the corresponding participant within the machine data communication network 10. Moreover, the participating communication partners 20, 28 only see those transactions that are relevant to them, which constitutes a difference to the classic blockchain method. To prevent "double spending", so-called notaries are used. By using Corda, a simple and already established method can be used in order to be able to implement the administration of the intelligent contracts 24.

FIG. 2 shows a schematic flowchart of an embodiment of a method according to a further, in particular a second, independent aspect of the invention. It can be seen, in particular, in FIG. 2 that yet another communication partner 36 is provided within the machine data communication network 10. This yet further communication partner 36 can be, for example, a service provider. The further communication partner 28 can be, for example, a backend server of a motor vehicle manufacturer when the network unit 12, for example, is provided as a motor vehicle.

In the present exemplary embodiment, a replacement of the first hardware component 14 with a second hardware component 38 has been carried out within the network unit 12. The second hardware component 38 has a second hardware security module 40, in particular.

In particular, FIG. 2 shows a method for replacing the first hardware component 14 of the network unit 12 of the machine data communication network 10, in which the network unit 12 of the machine data communication network 10 with the first hardware component 14 is provided with a digital identity DI. For the digital identity DI, a signature of the network unit 12 is generated in the machine data communication network 10 based on a first private key for a communication partner 20 of the network unit 12, wherein the first private key is stored in a first hardware security module 16 of the first hardware component 14, and a first public key corresponding to the first private key and the signature is disclosed to the communication partner 20, in order to verify the identity of the network unit 12.

The separate identification device 18 is provided in the network unit 12, and the first public key is transferred from the first hardware security module 16 to the identification device 18, wherein the first public key of the identification device 18 is stored by means of an intelligent contract 24 of the identification device 18 for the communication of the network unit 12 with the communication partner 20, and the intelligent contract 24 is transmitted by means of the distributed ledger technology 26 to the communication partner 20, and wherein, when replacing the first hardware component 14 with the second hardware component 28, a key replacement process is carried out by means of the intelligent contract 24 and the distributed ledger technology 26 for replacing the first public key with a second public key for the second hardware component 38.

In particular, FIG. 2 shows the already implemented replacement of the first hardware component 14 with the second hardware component 38.

In particular, it can be provided that the key replacement process is started by the communication partner 20 for replacing the first hardware component 14 with the second hardware component 38. Alternatively, the key replacement process can be carried out by the further communication partner 28 or the still further communication partner 36.

Furthermore, it can be provided that, when replacing the first hardware component 14 with the second hardware component 38, a state of the intelligent contract 24 is changed during the key replacement process.

In particular, FIG. 2 thus shows the machine data communication network 10 at a further point in time at which the second hardware component 38 has been replaced. The intelligent contract 24 must thus be "updated" to the second hardware component 38. Any data generated by the network unit 12 during the first point in time according to FIG. 1 has been generated with the first public key and can still be verified, since this is still within the intelligent contract 24. The key replacement process is started and can be started, in particular, by any communication partner 20, 28, 36. For example, it can be provided in FIG. 2 below that the key replacement process can be started by means of the still further communication partner 36, wherein this is to be seen purely as an example. For example, the corresponding replacement of the first hardware component 14 with the second hardware component 38 may have been carried out by the service provider, which corresponds to the still further communication partner 36 in this exemplary embodiment, wherein the key replacement process is then triggered by means of the further communication partner 36. The vehicle manufacturer, which in this case corresponds to the further communication partner 28, must sign the corresponding change, below the transaction, in exactly the same way as the communication partner 20. The intelligent contract 24 is then updated, and the second public key is used by the second hardware component 38 from this point in time onwards, in order to correspondingly sign the further messages.

In particular, it can be seen in FIGS. 1 and 2 that a computer program is provided according to the invention that can be loaded directly on a memory of a control device of a processor device of the identification device 18, with program means in order to implement the steps of the method according to FIG. 1 and FIG. 2 when the program is carried out in the control device of the processor device of the identification device 18.

Furthermore, an electronically readable data medium is also disclosed by FIGS. 1 and 2, with electronically readable control information stored thereon, which is formed at least in such a way that it carries out a method according to FIGS. 1 and 2 when using the data medium in a control device of a processor device of the identification device 18.

Overall, the invention according to FIGS. 1 and 2 enables the implementation of the digital identification concept for system connections, which are based on hardware security features. These system components can be replaced during the lifetime of the system connections without impeding the continuity of the digital identity DI of the system.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for initial setup of a machine data communication network, the method comprising:
   providing a network unit of the machine data communication network with a first hardware component having a digital identity, wherein for the digital identity, a signature of the network unit is generated based on a first private key for a communication partner of the network unit in the machine data communication network;
   storing the first private key in a first hardware security module of the first hardware component;
   disclosing, in order to verify the identity of the network unit, a first public key corresponding to the first private key and the signature to the communication partner;
   transferring the first public key from the first hardware security module to an identification device, which is arranged in the network unit and is separate from the first hardware security module;
   saving the first public key of the identification device in the identification device using an intelligent contract for communication of the network unit with the communication partner;
   saving the intelligent contract in the identification device; and
   transmitting the intelligent contract using distributed ledger technology to the communication partner for the initial setup of the machine data communication network.

2. The method of claim 1, wherein changes relating to a configuration between the network unit and the communication partner are changed and saved during a lifecycle of the network unit in the intelligent contract and transferred to the communication partner using the distributed ledger technology.

3. The method of claim 1, further comprising:
   saving one or more of the following in the intelligent contract
      permission information of the network unit,
      software versions of the network unit,
      property information of the network unit,
      insurance information of the network unit,
      system configurations of the network unit,
      freely switched functions within the network unit, and
      further hardware components of the network unit.

4. The method of claim 1, further comprising:
   generating the intelligent contract using Corda.

5. The method of claim 1, wherein a further communication partner is provided within the machine data communication network, wherein communication with the further communication partner is performed using the intelligent contract of the distributed ledger technology.

6. The method of claim 5, further comprising:
   performing a cross-verification between the identification device, the communication partner, and the further communication partner.

7. The method of claim 1, wherein the identification device includes an application layer, a privacy layer, and a trust layer.

8. The method of claim 7, wherein the intelligent contract is saved on the trust layer.

9. The method of claim 1, wherein the network unit is a motor vehicle.

10. A method for replacing a first hardware component of a network unit of a machine data communication network, the method comprising:
    providing the network unit of the machine data communication network with a first hardware component having a digital identity, wherein for the digital identity, a signature of the network unit is generated based on a first private key for a communication partner of the network unit in the machine data communication network,
    storing the first private key in a first hardware security module of the first hardware component,
    disclosing, in order to verify the identity of the network unit, a first public key corresponding to the first private key and the signature the communication partner;
    transferring the first public key from the first hardware security module to an identification device, which is arranged in the network unit and is separate from the first hardware security module;
    saving the first public key of the identification device in the identification device using an intelligent contract for the communication of the network unit with the communication partner;
    saving the intelligent contract in the identification device;
    transmitting the intelligent contract using distributed ledger technology to the communication partner; and
    performing a key replacement process when replacing the first hardware component with a second hardware component, wherein the key replacement process replaces the first public key with a second public key for the second hardware component using the intelligent contract and the distributed ledger technology.

11. The method of claim 10, wherein the key replacement process is started by the communication partner for replacing the first hardware component with the second hardware component.

12. The method of claim 10, wherein a state of the intelligent contract is changed when replacing the first hardware component with the second hardware component during the key replacement process.

13. A machine data communication network, comprising:
    a network unit, which has a hardware component having a hardware security module and an identification device, wherein the identification device includes a processor executing a computer program loaded from a non-transitory memory of the identification device; and
    a communication partner,
    wherein the hardware component has a digital identity, wherein for the digital identity, a signature of the network unit is generated based on a first private key for the communication partner,
    wherein the hardware security module stores the first private key,
    wherein in order to verify the identity of the network unit, a first public key corresponding to the first private key and the signature is transferred to the communication partner,
    wherein the hardware security module is configured to transfer the first public key to the identification device, which is separate from the hardware security module;
    wherein the processor of the identification device, executing the computer program, is configured to save the first public key in the identification device using an intelligent contract for communication of the network unit with the communication partner, and wherein the intelligent contract is transmitted, using distributed ledger technology, to the communication partner for the initial setup of the machine data communication network.

\* \* \* \* \*